(12) United States Patent
Fukuzawa et al.

(10) Patent No.: US 9,166,672 B2
(45) Date of Patent: Oct. 20, 2015

(54) WIRELESS COMMUNICATION SYSTEM, RELAY SYSTEM, REPEATER DEVICES AND SYNCHRONIZATION METHOD

(75) Inventors: Shoji Fukuzawa, Osaka (JP); Yoshiyuki Tanaka, Osaka (JP)

(73) Assignee: ICOM INCORPORATED, Osaka (JP)

( * ) Notice: Subject to any disclaimer, the term of this patent is extended or adjusted under 35 U.S.C. 154(b) by 35 days.

(21) Appl. No.: 13/121,937

(22) PCT Filed: Oct. 28, 2009

(86) PCT No.: PCT/JP2009/068536
§ 371 (c)(1),
(2), (4) Date: Mar. 30, 2011

(87) PCT Pub. No.: WO2010/050532
PCT Pub. Date: May 6, 2010

(65) Prior Publication Data
US 2011/0199960 A1   Aug. 18, 2011

(30) Foreign Application Priority Data
Oct. 28, 2008  (JP) ................... 2008-277507

(51) Int. Cl.
*H04W 84/08* (2009.01)
*H04B 7/155* (2006.01)
*H04L 7/04* (2006.01)
*H04W 92/20* (2009.01)
*H04W 56/00* (2009.01)

(52) U.S. Cl.
CPC ............ *H04B 7/15542* (2013.01); *H04L 7/041* (2013.01); *H04W 56/0015* (2013.01); *H04W 84/08* (2013.01); *H04W 92/20* (2013.01)

(58) Field of Classification Search
CPC ... H04W 72/12; H04W 56/00; H04W 56/001; H04W 56/0015; H04W 72/042
USPC .......................................... 370/315, 327, 329
See application file for complete search history.

(56) References Cited

U.S. PATENT DOCUMENTS 5,740,168 A * 4/1998 Nakamura et al. ............ 370/347
6,449,290 B1   9/2002 Willars
(Continued)

FOREIGN PATENT DOCUMENTS

CN   101116363     1/2008
EP   2048822 A1 * 4/2009 ............... H04B 3/36
(Continued)

OTHER PUBLICATIONS

Notification of First Office Action issued on May 17, 2013, in corresponding Chinese Patent Application No. 200980141238.3.
(Continued)

*Primary Examiner* — Andrew Chriss
*Assistant Examiner* — Romani Ohri
(74) *Attorney, Agent, or Firm* — Warner Norcross & Judd LLP

(57) ABSTRACT

A wireless communication system comprises a relay system including a plurality of relay devices and a plurality of wireless terminal devices. Each relay device transmits control information to the wireless terminal device which is registered in the own relay device, and each wireless terminal device selects, based on the control information received from the relay device which registers the own wireless terminal device, a channel which is currently able to relay a communication among channels respectively allocated to the relay devices to establish a communication between the wireless terminal devices. Each relay device acquires information configuring the control information via a communication line and causes a downlink signal wirelessly transmitted by the own relay device to synchronize with a communication signal, and each wireless terminal device maintains, when shifting a channel for communication to another channel, a synchronized state established in a channel prior to shifting.

8 Claims, 9 Drawing Sheets

(56) References Cited

U.S. PATENT DOCUMENTS

| | | | |
|---|---|---|---|
| 6,590,891 B1* | 7/2003 | Jacquet et al. | 370/350 |
| 7,751,448 B2* | 7/2010 | Laroia et al. | 370/505 |
| 2002/0012362 A1 | 1/2002 | Yahata | |
| 2007/0047588 A1* | 3/2007 | Koga et al. | 370/501 |
| 2007/0121484 A1* | 5/2007 | Kim et al. | 370/208 |
| 2008/0070578 A1 | 3/2008 | Flore | |
| 2009/0029710 A1* | 1/2009 | Ochiai et al. | 455/450 |
| 2009/0303918 A1* | 12/2009 | Ma et al. | 370/315 |

FOREIGN PATENT DOCUMENTS

| | | |
|---|---|---|
| JP | 02-164141 | 6/1990 |
| JP | H02164141 A | 6/1990 |
| JP | 10-190562 | 7/1998 |
| JP | 2001-237856 | 8/2001 |
| JP | 2002-369238 | 12/2002 |
| JP | 2004-260382 | 9/2004 |
| JP | 2007-281800 | 10/2007 |
| JP | 2007-295134 | 11/2007 |
| WO | 2006/088082 | 8/2006 |
| WO | 2008/007418 | 1/2008 |

OTHER PUBLICATIONS

Notification of Reasons for Rejection issued on May 14, 2013, in corresponding Japanese Patent Application No. 2009-248331.
Supplementary European Search Report dated May 6, 2014 for European Patent Application No. EP09823642.

* cited by examiner

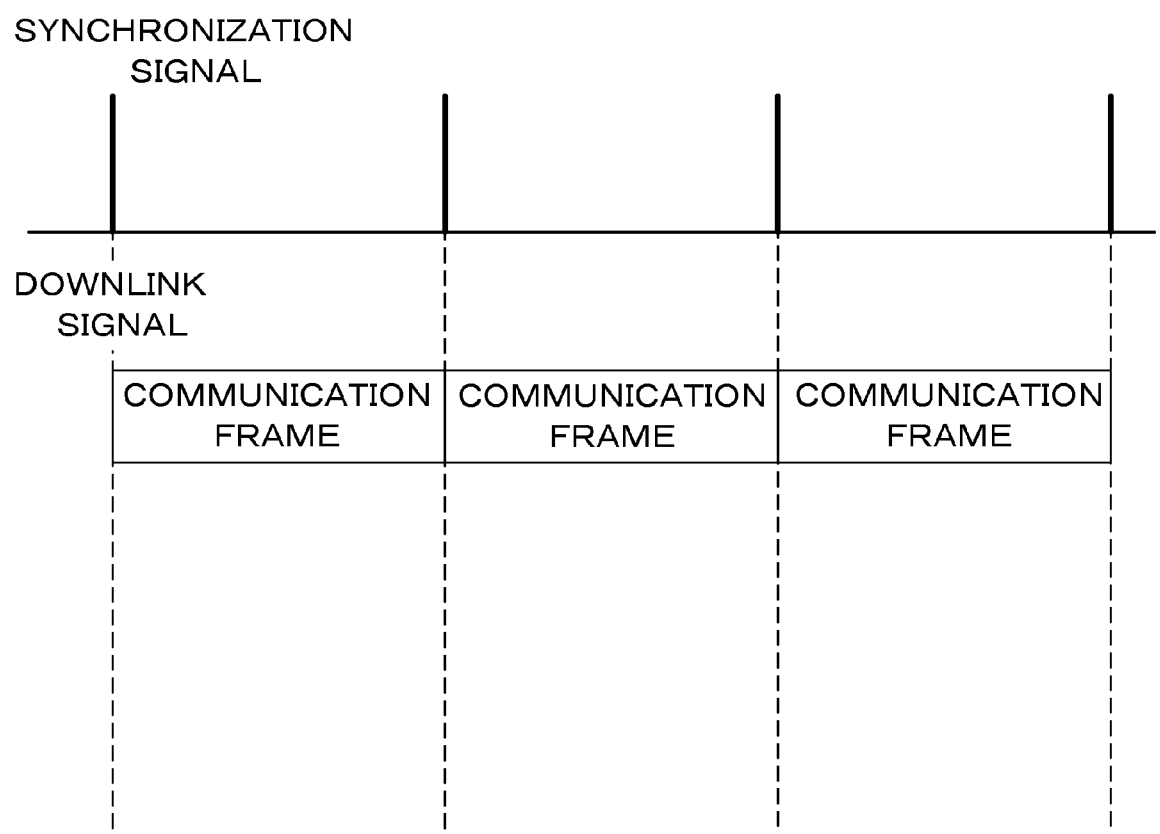

WIRELESS COMMUNICATION SYSTEM, RELAY SYSTEM, REPEATER DEVICES AND SYNCHRONIZATION METHOD

RELATED APPLICATION

This application is based on Japanese Patent Application No. 2008-277507 filed on Oct. 28, 2008. The specification, claims, and drawings of this application are entirely incorporated herein by reference in this specification.

TECHNICAL FIELD

The present invention relates to a wireless communication system, a relay system, a relay device, and a synchronization method.

BACKGROUND ART

There is known a trunking wireless communication system (hereinafter, referred to as a "trunking system"). The trunking system has plural repeaters in a site, and plural wireless terminal devices share plural communication channels via plural repeaters. The trunking system includes a so-called dedicated control type with an exclusive control channel and a so-called distributed control type without an dedicated control channel.

According to the dedicated control type, plural wireless terminal devices set an idle communication channel based on control information from a control channel, and communicate with each other via the idle communication channel.

According to the distributed control type, plural wireless terminal devices set an idle communication channel based on control information from a home repeater which is registered in each wireless terminal device beforehand, and communicate with each other via the idle communication channel. Moreover, among plural repeaters, one repeater functions as a master repeater, and other repeaters function as slave repeaters. The slave repeater operates while synchronizing with a synchronization signal supplied from the master repeater.

Patent Literature 1 discloses a technology of automatically changing a repeater to a master repeater when the master repeater breaks down. According to such technology, the master repeater generates a synchronization signal and transmits the generated synchronization signal to the other plural slave repeaters. Each repeater is connected to another repeater by a synchronization signal connector in order to exchange synchronization signals, and also connected to another repeater by a LAN in order to communicate with each other for a control related to the connection of a communication channel.

Patent Literature 1: Unexamined Japanese Patent Application KOKAI Publication No. 2007-281800

DISCLOSURE OF INVENTION

Problem to be solved by the Invention

According to the trunking system, when wireless terminal devices communicate with each other, a communication channel is set based on a control channel in the case of the dedicated control type and based on control information from a home repeater in the case of the distributed control type. That is, in the trunking system, the wireless terminal devices do not always communicate with each other through the same communication channel, and a communication channel is changed as needed.

In this manner, according to the trunking system, when a communication channel is changed, there is a possibility that the operation of a repeater becomes out of the synchronization with that of a wireless terminal device. More specifically, there is a case in which the wireless terminal device cannot receive a communication frame transmitted by the repeater in synchronization with that communication frame. When the detection of the frame synchronization by the wireless terminal device is delayed, data to be received by the wireless terminal device loses a header.

Patent Literature 1 discloses a technology of securing synchronization among plural repeaters by changing a repeater to a master repeater when the master repeater breaks down. However, nowhere in Patent Literature 1 is disclosed a technology of establishing a frame synchronization at a fast speed when a communication channel is changed. Moreover, the trunking system disclosed in Patent Literature 1 has an exclusive signal line for a synchronization signal separately from a signal line for a control related to the connection of a communication channel, and this configuration results in increase of the cost of a repeater.

Conversely, a time may be shortened which is requisite for the wireless terminal device to establish synchronization with the communication frame transmitted by the repeater after the channel is changed. However, a receiving circuit and a control circuit both operating at a fast speed are requisite, and the circuit configuration becomes advanced and complex, thereby increasing the cost of the wireless terminal device.

The present invention has been made in order to overcome the foregoing problems, and it is an object of the present invention to provide a wireless communication system, a relay system, a relay device which facilitate a wireless terminal device to establish a synchronization with a wireless signal when the wireless terminal device changes a communication channel, and a method for the synchronization.

Moreover, it is another object of the present invention to provide a wireless communication system, a relay system, a relay device which enable a wireless terminal device to promptly establish a synchronization with a wireless signal when the wireless terminal device changes a communication channel without providing an exclusive signal line for establishing a synchronization with a channel change to a repeater and without providing expensive receiving circuit and control circuit to the wireless terminal device, and a method for the synchronization.

To achieve the foregoing objects, a wireless communication system according to a first aspect of the present invention comprises:

a relay system comprising a plurality of relay devices which are connected one another via a communication line and to which unique channels are respectively allocated; and a plurality of wireless terminal devices which communicate with each other via the relay system, wherein each relay device transmits control information to the wireless terminal device which is registered in the own relay device, each wireless terminal device receives the control information transmitted from the relay device which registers the own wireless terminal device, selects a channel which is currently able to relay a communication among the channels respectively allocated to the relay devices based on the received control information, and communicates with another wireless terminal device via the selected channel, and each relay device exchanges a communication signal via the communication line to exchange information configuring the control information, and synchronize a downlink signal which is wirelessly transmitted by the own relay device with the communication signal transmitted over the communication line, and each wireless terminal device maintains, when shifting a channel for communication to another channel, a synchronized state established in a channel prior to shifting for at least a predetermined period.

It is also possible that a unit length of the communication signal transmitted over the communication line is set to be equal to a frame length of the downlink signal transmitted by each relay device.

It is also possible that the relay system comprises a master relay device which transmits a synchronization signal to the communication line, and a slave relay device which acquires the synchronization signal via the communication line.

It is also possible that the master relay device includes a synchronous circuit which generates a synchronization signal, the slave relay device includes a synchronous circuit which oscillates in synchronization with a received synchronization signal, the master relay device and the slave relay device transmit respective downlink signals in synchronization with the synchronization signal, and the wireless terminal device includes a synchronous circuit which synchronizes with a received downlink signal, and the synchronous circuit is able to maintain an established synchronized state for equal to or more than a synchronization period.

It is also possible that each relay device transmits information held in the relay device at an allocated position to the relay device in the communication signal transmitted over the communication line, and each relay device further acquires information held in another relay device from a communication frame in the communication line and generates control information which is wirelessly transmitted by the own relay device based on the acquired information.

To achieve the foregoing objects, a relay system according to a second aspect of the present invention comprises a plurality of relay devices which are connected one another via a communication line and to which unique relaying channels are respectively allocated, and further comprises:

a master relay device which transmits a synchronization signal for establishing a synchronization with the plurality of relay devices to the communication line; and a slave relay device which acquires the synchronization signal transmitted by the master relay device via the communication line and which operates in synchronization with the synchronization signal.

To achieve the foregoing objects, a relay device according to a third aspect of the present invention is connected to a communication line and to which a unique relaying channel is allocated, and comprises:

an output unit which outputs own-relay-device information held in the own relay device at an allocated position to the own relay device in a communication signal transmitted over the communication line;

an input unit which inputs another-relay-device information output by another relay device from the communication signal transmitted over the communication line; and a processor which generates control information for controlling a wireless terminal device which the own relay device wirelessly communicates based on another-relay-device information, wherein the processor synchronize a downlink signal wirelessly transmitted by the relay device with the communication signal transmitted over the communication line.

To achieve the foregoing objects, a synchronization method according to a fourth aspect of the present invention causes a relay system comprising a plurality of relay devices which are connected one another via a communication line and to which unique relaying channels are respectively allocated to synchronize with a plurality of wireless terminal devices which communicate with each other via the relay system, and comprises:

a transmission step in which the relay device transmits control information to the wireless terminal device which is registered in the own relay device; and a communication step in which the wireless terminal device selects a communication channel from among communication channels assigned to each relay device which is currently able to relay a communication signal, based on the control information received from the relay device which registers the wireless terminal device wherein in the transmission step, the relay device acquires information for configuring the control information via the communication line and synchronize a downlink signal wirelessly transmitted by the own relay device with a communication signal transmitted over the communication line, and in the communication step, the wireless terminal device maintains, when shifting a channel for communication to another channel, a synchronized state established in a channel prior to shifting.

Effect of the Invention

According to the present invention, it is possible for a wireless terminal device to promptly establish a synchronization with a wireless signal when the wireless terminal device changes a channel with a simple configuration.

BRIEF DESCRIPTION OF DRAWINGS

FIG. 9 is a timing chart showing a relationship between the synchronization signal and the communication frame.

BEST MODE FOR CARRYING OUT THE INVENTION

An explanation will be given of a wireless communication system, a relay system, a relay device, and a synchronization method according to an embodiment of the present invention with reference to the accompanying drawings.

Figure 1:
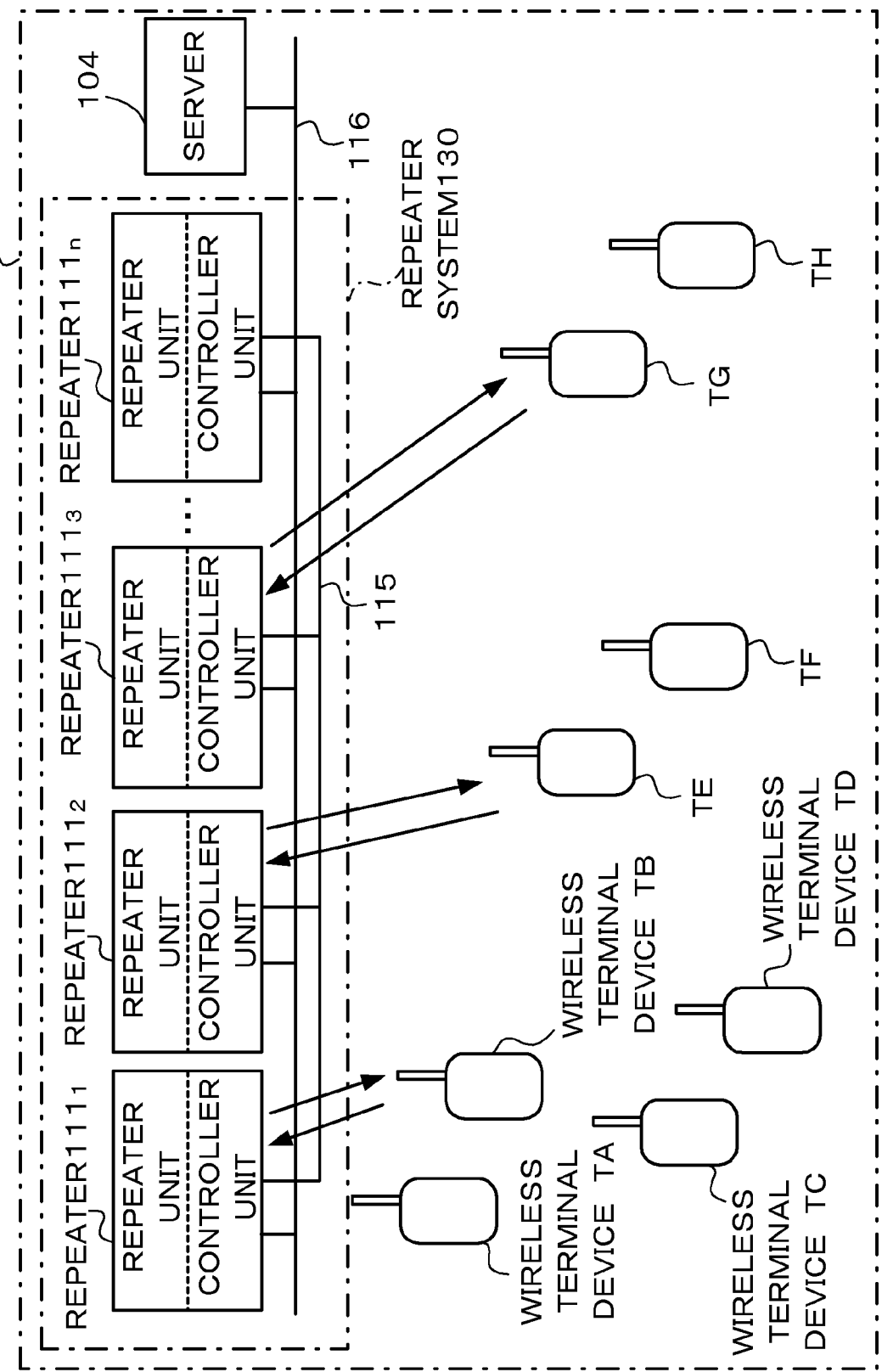
FIG. 1 is a diagram showing a configuration of a wireless communication system according to an embodiment of the present invention.

As shown in FIG. 1, a site 100 of the wireless communication system according to the present embodiment includes plural (e.g., thirty units at maximum) repeaters $111_1$ to $111_n$.

Unique relaying channels are respectively allocated to the plural repeaters $111_1$ to $111_n$, and those repeaters bear a relaying process in the same communication area. The repeaters $111_1$ to $111_n$ are connected one another by a communication line 115 and configure a repeater system (a relay system) 130. The repeater system 130 configures a communication area with n number of communication channels (where n is the number of repeaters). Moreover, the repeaters $111_1$ to $111_n$ are connected to a server 104 via a communication line 116 like an IP connection line. In general, the communication line 115 is called a "system bus", so that the communication line 115 is referred to as the system bus in the following explanation.

The server 104 can perform various settings of the plural repeaters $111_1$ to $111_n$ through a remote operation. The repeaters $111_1$ to $111_n$ each includes a repeater unit and a controller unit. Moreover, the repeaters $111_1$ to $111_n$ exchange information on respective repeaters $111_1$ to $111_n$ (e.g., information indicating whether or not such repeaters are currently performing a relay operation) via the system bus 115 to share such information. The repeaters $111_1$ to $111_n$ have pre-determined time slot for transmit data to the system bus 115. Accordingly, the repeaters $111_1$ to $111_n$ transmit data to pre-determined time slot.

Among the plural repeaters $111_1$ to $111_n$, one repeater is set as a "master repeater". In this embodiment, the repeater $111_1$ is the master repeater. The master repeater transmits a synchronization signal to the system bus 115 for establishing a synchronization among the repeaters $111_1$ to $111_n$ including the master repeater itself.

Wireless terminal devices TA to TH each registers any one repeater among the repeaters $111_1$ to $111_n$ as a home repeater. Likewise, the repeaters $111_1$ to $111_n$ register respective information of the wireless terminal devices TA to TH which respectively register the own repeater as a home repeater. The wireless terminal devices TA to TH each receives a downlink signal of the home repeater in a standby mode. Each of the wireless terminal devices TA to TH acquire idle channel information inserted in the downlink signal of the home repeater, and shift a communication channel (a channel used for a communication) to an idle channel indicated by the idle channel information to communicate with another wireless terminal device via the idle channel. After the communication ends, the wireless terminal device returns the communication channel to the channel of the home repeater, and returns to the standby mode. In FIG. 1, the wireless terminal devices TA to TD register the repeater $111_1$ as a home repeater, the wireless terminal devices TE and TF register the repeater $111_2$ as a home repeater, and the wireless terminal devices TG and TH register the repeater $111_3$ as a home repeater.

The wireless communication system in FIG. 1 is a distributed trunking system in which the wireless terminal devices TA to TH share the plural repeaters $111_1$ to $111_n$ and select at least one repeater as needed for relaying. The distributed trunking system has no dedicated control channel, and all channels function not only as control channels but also as communication channels. For example, it is assumed that the wireless terminal device TA communicates with the other wireless terminal devices TB to TD which are registered in the same home repeater. In this case, the wireless terminal device TA acquires channel information which is included in a downlink signal from its home repeater $111_1$ and which indicates channels enabling a communication, determines the channels enabling a communication based on the acquired channel information, selects one of the determined channels enabling a communication (e.g., the channel of the repeater $111_3$), and shifts a own communication channel to the selected channel.

Moreover, the wireless terminal device TA transmits a call request signal to this channel (the channel provided by the repeater $111_3$), receives a response to the effect that a communication is permitted from the repeater $111_3$, and establishes a link. In response to the establishment of the link, the home repeater $111_1$ transmits a control signal which instructs shifting to a communication channel (the channel of the repeater $111_3$) where the link is established to the wireless terminal devices TB to TD that are communication counterparties. In response to the control signal, the wireless terminal devices TB to TD change respective communication channels to the instructed channel to communicate with the wireless terminal device TA. That is, the repeater $111_1$ operates as a control channel for the wireless terminal devices TA to TD which register the repeater as the home repeater, and operates as a communication channel for the other wireless terminal devices TE to TH. Examples of a communication among the wireless terminal devices TA to TD are a group communication across the whole wireless terminal devices TA to TD, and with the unit of such group being further divided, a group communication in a small group defined by, for example, the wireless terminal devices TA and TB, or an individual calling (referred to as an "Individual Call") with a wireless terminal device being targeted.

Figure 2:
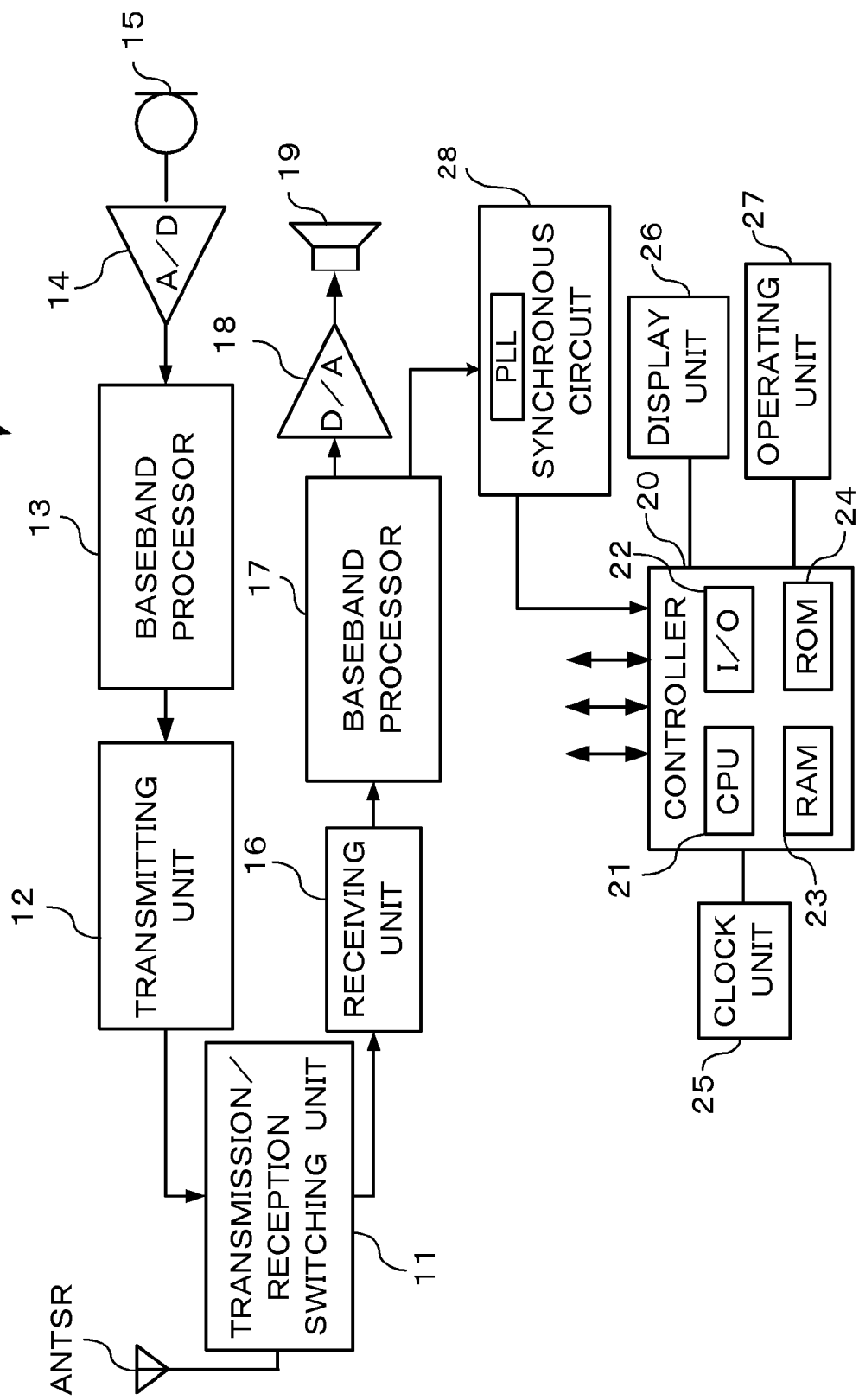
FIG. 2 is a block diagram showing a configuration of a wireless terminal device in FIG. 1.
Figure 3:
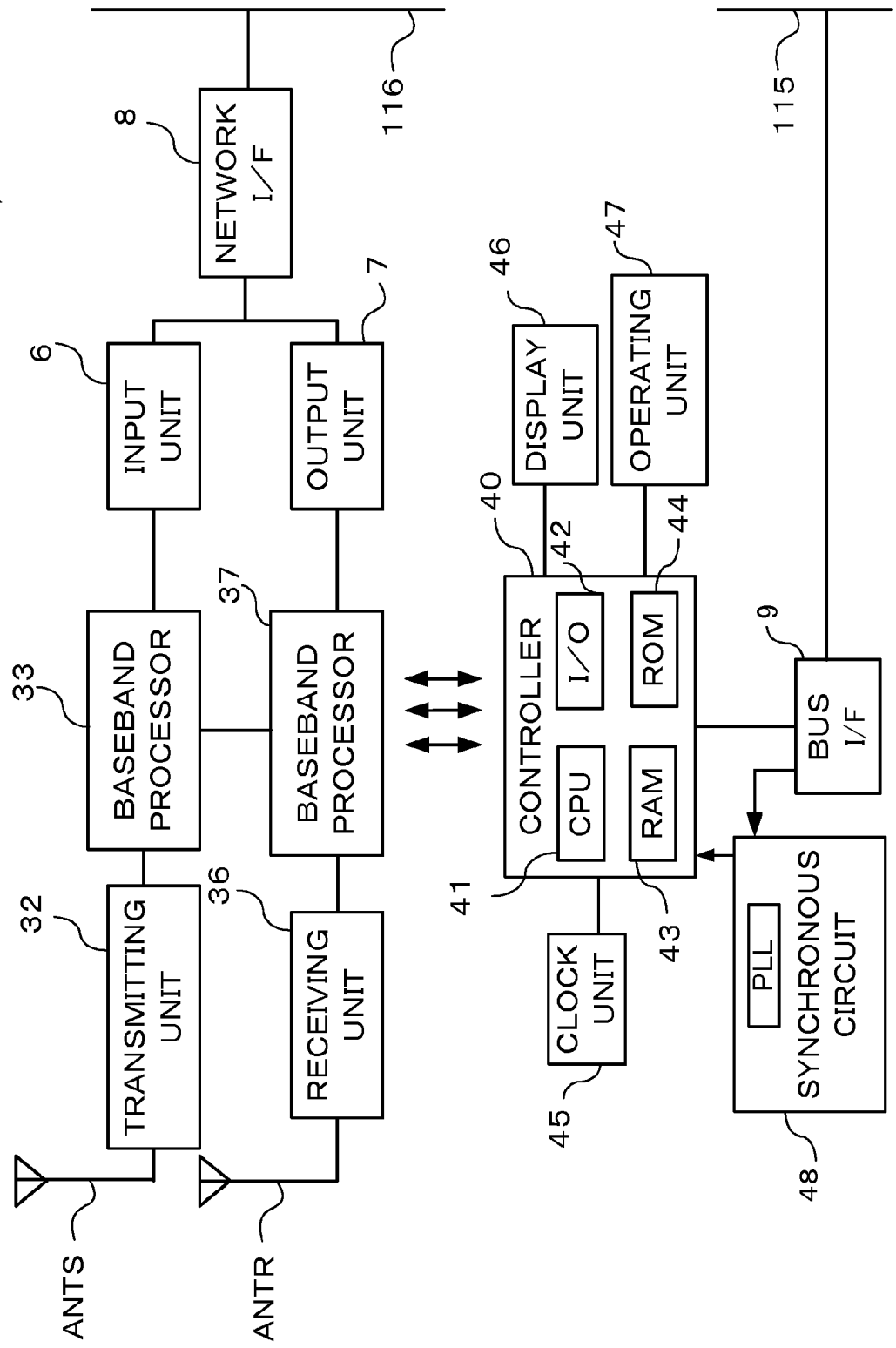
FIG. 3 is a block diagram showing a configuration of a repeater in FIG. 1.
Figure 4:
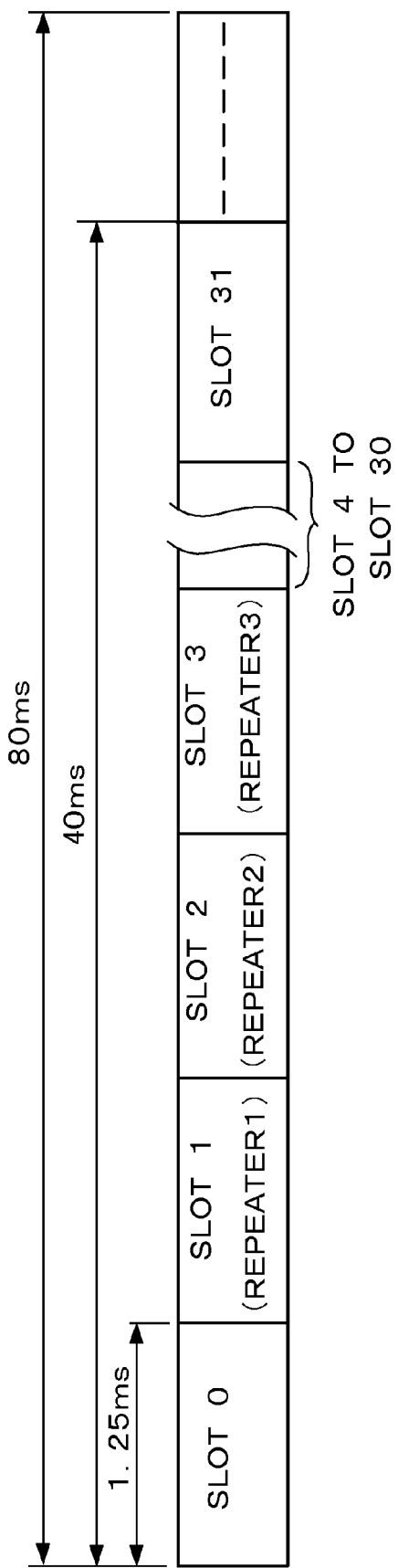
FIG. 4 is a diagram showing a synchronization signal transmitted to a system bus from a master repeater and including a time slot which follows the synchronization signal and which is allocated to each repeater.

Next, with respect to each of the wireless terminal devices TA to TH and to each of the repeaters $111_1$ to $111_n$, an explanation will be given of a configuration and a function. FIG. 2 is a block diagram showing a configuration of each of the wireless terminal devices TA to TH in FIG. 1. FIG. 3 is a block diagram showing a configuration of each of the repeaters $111_1$ to $111_n$ in FIG. 1. FIG. 4 is a diagram showing a synchronization signal transmitted to the system bus 115 from the master repeater $111_1$ and a time slot which follows the synchronization signal and which is allocated to each repeater. FIG. 5A and FIG. 5B are diagrams each showing a format of a communication frame exchanged between the repeater and the wireless terminal device. The communication frame includes a header part and a data part. Contents of the header part and those of the data part will be discussed later in detail.

As shown in FIG. 2, as blocks for a signaling system, the wireless terminal devices TA to TH each includes an antenna ANTSR, a transmission/reception switching unit 11, a transmitting unit 12, a baseband processor 13, an A/D converter 14, a microphone 15, a receiving unit 16, a baseband processor 17, a D/A converter 18, and a speaker 19. Moreover, as blocks for a control system, the wireless terminal devices TA to TH each includes a controller 20, a clock unit 25, a display unit 26, an operating unit 27, and a synchronous circuit 28. Furthermore, the controller 20 has a CPU (central processing unit) 21, an I/O (input/output unit) 22, a RAM (random access memory) 23, a ROM (read-only memory) 24, and an internal bus which connects those together.

The blocks for the signaling system of each of the wireless terminal devices TA to TH are controlled by the CPU 21. The CPU 21 runs a control program stored in the ROM 24 to control the whole wireless terminal device, processes commands and data both input from the operating unit 27 through the I/O 22 and data acquired from the baseband processor 17, and temporarily stores such data in the RAM 23. Moreover, the CPU 21 displays commands and data both stored as needed on the display unit 26 comprising an LCD (Liquid Crystal Display) or the like. Moreover, the CPU 21 displays a current time acquired from the clock unit 25 on the display unit 26.

The synchronous circuit 28 has a built-in PLL (Phase Locked Loop) circuit, oscillates in synchronization with a synchronization signal included in a received signal supplied from the baseband processor 17, and also with a communication frame which is received periodically, etc., and generates a synchronization signal to be a reference for the operation timing of each of the wireless terminal devices TA to TH. The synchronous circuit 28 further generates an operation clock synchronized with that synchronization signal, and supplies such generated operation clock to the controller 20, etc. The synchronous circuit 28 has a relatively long time constant, and once establishes a synchronization, maintains a synchronized state for a certain length of period (e.g., between one to three frame periods).

Note that the controller 20 may employ a structure such that a rewritable nonvolatile memory card like a flash memory which records identification information unique to the wireless terminal device is detachably attached.

Next, with respect to the blocks for the signaling system, the transmission/reception switching unit 11 has an input end connected to the antenna ANTSR, and has an output end alternatively connected to the transmitting unit 12 and to the receiving unit 16 under the control of the CPU 21. When no transmission operation is made through the operating unit 27, the wireless terminal devices TA to TH is in a receiving (standby) mode, and the output end of the transmission/reception switching unit 11 is connected to the receiving unit 16. Conversely, when a transmission operation is made through the operating unit 27, the information wireless terminal device TA to TH are becomes a transmitting mode, and the output end of the transmission/reception switching unit 11 is connected to the transmitting unit 12.

When the wireless terminal device is in the transmitting mode, the microphone 15 converts an voice input given by a user into an analog voice signal and outputs it to the A/D converter 14.

The A/D converter 14 converts the analog voice signal from the microphone 15 into a digital voice signal and outputs it to the baseband processor 13.

The baseband processor 13 generates a communication frame (a baseband signal) in a predetermined format based on the digital voice signal from the A/D converter 14, or based on data stored in the RAM 23 of the controller 20, and outputs the generating communication frame to the transmitting unit 12.

The transmitting unit 12 modulates a carrier wave using the communication frame from the baseband processor 13, and transmits the modulated carrier wave to a repeater currently performing a relay operation via the transmission/reception switching unit 11 and the antenna ANTSR. GMSK (Gaussian filtered Minimum Shift Keying), PSK (Phase Shift Keying), QAM (Quadrature Amplitude Modulation), FSK (Frequency Shift Keying), etc., is used as the modulation scheme of the transmitting unit 12.

When the wireless terminal devices TA to TH are in the receiving mode, the transmission/reception switching unit 11 connects the antenna ANTSR and the receiving unit 16 together. The receiving unit 16 receives respective wireless signals from the repeaters $111_1$ to $111_n$ via the antenna ANTSR. The receiving unit 16 amplifies the received signal, performs a signal process like a demodulation process on the received signal, and outputs the processed signal to the baseband processor 17.

The baseband processor 17 extracts a communication frame from the demodulated signal output by the receiving unit 16. Moreover, the baseband processor 17 outputs information on a header part H of the extracted communication frame to the CPU 21. The CPU 21 analyzes the information on the header part H, and when the transmission destination of that received signal is a own station, causes the D/A converter 18 to output data of an voice signal included in a data part D, temporarily stores data other than the voice signal included in the data part D in the RAM 23, and displays such data as needed on the display unit 26. The D/A converter 18 converts the voice signal from the baseband processor 17 from the digital voice signal into an analog voice signal, and causes the speaker 19 to generate sounds corresponding to such voice signal.

As shown in FIG. 3, as blocks for a signaling system, the repeaters $111_1$ to $111_n$ each includes an antenna ANTS for transmission only, a transmitting unit 32, a baseband processor 33, an antenna ANTR for reception only, a receiving unit 36, a baseband processor 37, an input unit 6, an output unit 7, and a network I/F (interface) 8. Moreover, as blocks for a control system, the repeaters $111_1$ to $111_n$ each includes a controller 40, a clock unit 45, a display unit 46, and an operating unit 47. Furthermore, the controller 40 has a CPU (central processing unit) 41, an I/O (input/output unit) 42, a RAM (random access memory) 43, a ROM (read-only memory) 44, and an internal bus which connects those together. Moreover, the repeaters $111_1$ to $111_n$ each includes a bus I/F (interface) 9 for transmitting information on a own device to the system bus 115 to be discussed later and for acquiring information from another repeater.

The repeaters $111_1$ to $111_n$ (e.g., the repeater $111_1$) each performs signal processes, such as an amplification process and a waveform process, on a wireless signal received from a departure wireless terminal device (e.g., the wireless terminal device TA), and transmits such processed wireless signal to a destination wireless terminal device (e.g., the wireless terminal device TB). Consequently, each of the repeaters $111_1$ to $111_n$ basically have the same configuration as that of each of the wireless terminal devices TA to TH shown in FIG. 2. Accordingly, structural elements which are basically same as those of the wireless terminal devices TA to TH shown in FIG. 2 will be denoted by the same reference numerals, and as operations of those structural elements duplicate those of the wireless terminal devices TA to TH, the explanation thereof will be omitted.

When the wireless terminal devices TA to TH communicate with each other via the repeaters $111_1$ to $111_n$, an uplink from the wireless terminal device to the repeater and a downlink from the repeater to the wireless terminal device establish a communication at substantially same time by changing respective frequencies or respective time slots. Consequently, the repeaters $111_1$ to $111_n$ each includes the antenna ANTS for transmission only and the antenna ANTR for reception only. Moreover, as shown in FIG. 1, each of the plural repeaters $111_1$ to $111_n$ are connected one another via the system bus 115, and are connected to the server 104 via the communication line 116 like the IP connection line.

Under the input control of the CPU 41, the input unit 6 inputs data or the like transmitted from the server 104 via the network I/F 8. Moreover, when such multisite network is built that a repeater communicates with another repeater in another site 100 configuring a different communication area, the repeater receives a communication frame from another repeater in another site via the network I/F 8.

Under the control of the CPU 41, the output unit 7 outputs data or the like requested from the server 104 via the network I/F 8. Moreover, when such multisite network is built that the repeater communicates with another repeater in another site 100 configuring the different communication area, the repeater transmits a communication frame to another repeater in another site via the network I/F 8.

The bus I/F 9 intermediates acquisition of a synchronization signal transmitted to the system bus 115 by a master repeater and of repeater information transmitted to the system bus 115 by the other repeaters under the input control of the CPU 41, and transmission of information on the own repeater to the system bus 115 under the output control of the CPU 41.

A synchronous circuit 48 has a PLL circuit, oscillates itself when the repeater functions as a master repeater, and generates a synchronization signal for the whole system. The synchronization signal is supplied to the controller 40 to be a reference timing for an operation, and as will be discussed later with reference to FIG. 4, is output over the system bus 115 to be transmitted to another repeater. When the repeater functions as a slave repeater, the synchronous circuit 48 oscillates in synchronization with a synchronization signal supplied via the bus I/F 9, generates an internal synchronization signal and supplies the generated internal synchronization signal to the controller 40. The internal synchronization signal becomes a reference timing for the operation of the repeater.

Next, an explanation will be given of a synchronization method of the embodiment with reference to FIG. 4 to FIG. 9.

FIG. 4 is a diagram showing a synchronization signal transmitted to the system bus 115 by a master repeater and a slot which follows the synchronization signal and which corresponds to each repeater. As shown in FIG. 4, the synchronization signal has a period of 80 ms, and the first half of 40 ms includes thirty-two slots from a slot 0 to a slot 31. Consequently, each slot has a time length of 1.25 ms. The first slot 0 includes a synchronization signal, and is transmitted by a specified repeater, i.e., the master repeater $111_1$ in accordance with a set algorithm. The other repeaters $111_2$ to $111_n$ serve as slave repeaters and acquire the synchronization signal. The repeaters $111_1$ to $111_n$, i.e., the repeater system 130 operates in synchronization with the synchronization signal. Any one of the slots from the slot 1 to the slot 31 other than the slot 0 for synchronization is allocated to each of the repeaters $111_1$ to $111_n$. The repeaters $111_1$ to $111_n$ each writes (outputs) information on each shared repeater (e.g., whether or not a relay channel is idle) in a slot allocated to a own repeater. The repeater $111_1$ which is the master repeater transmits the synchronization signal in the slot 0, and writes information on the repeater $111_1$ in a slot allocated to the repeater $111_1$ among the slots from the slot 1 to the slot 30. Note that the last slot 31 is undefined here.

Figure 5:
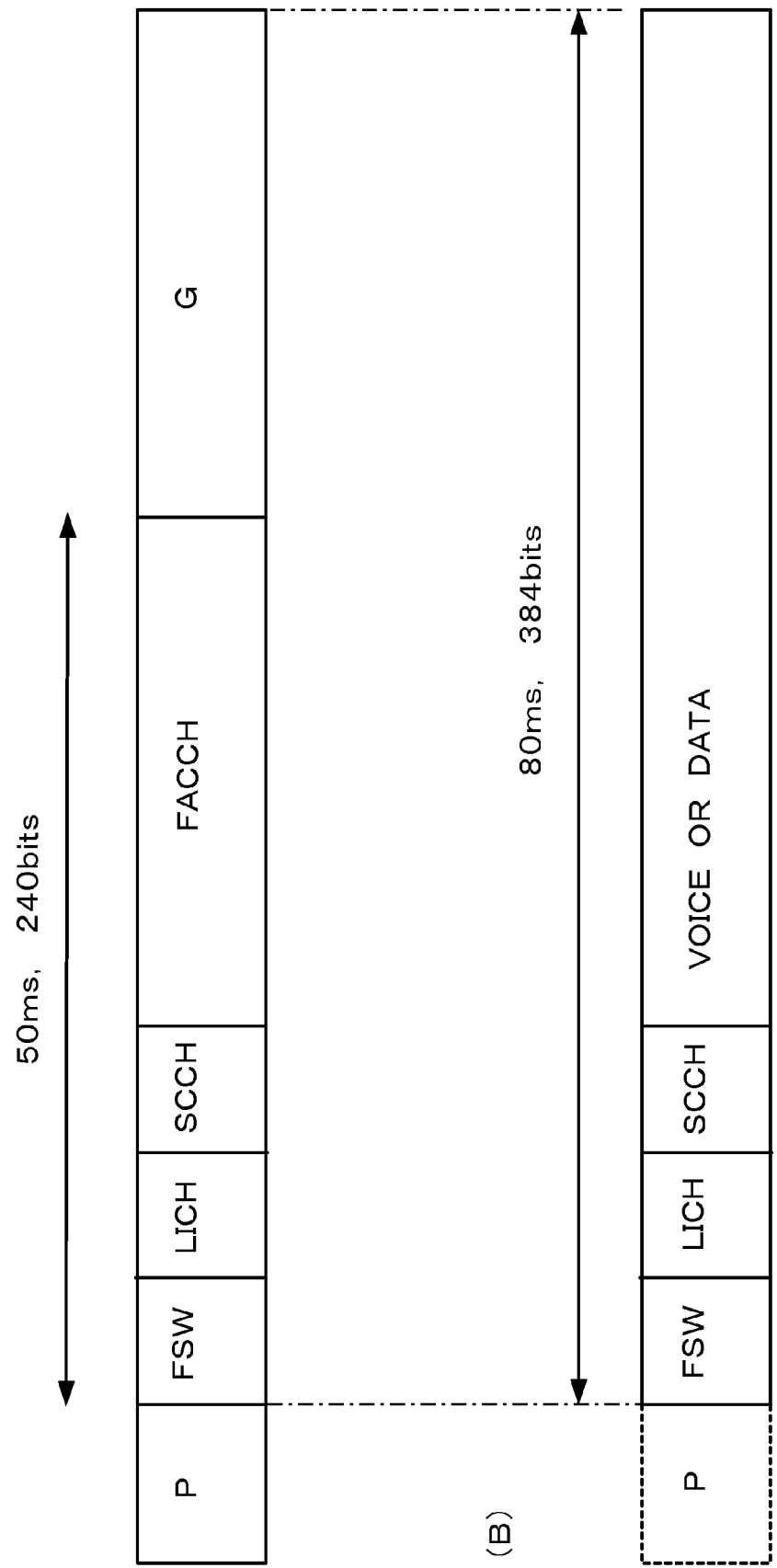
FIG. 5 is a diagram showing a format of a communication frame exchanged between the repeater and the wireless terminal device.

FIG. 5 is a diagram showing a format of a communication frame exchanged between the repeater and the wireless terminal device. FIG. 5A shows an illustrative format of a communication frame when a link with a communication channel is established, and FIG. 5B shows an illustrative format of a communication frame at the time of voice and data communication. The format of each communication frame shown in FIGS. 5A and 5B which is exchanged between a repeater and a wireless terminal device also has a period of 80 ms and has a configuration of 384 bits. In FIG. 5, data of a preamble (at the time of an initial transmission only) is inserted in P, data of a frame synchronization word is inserted in FSW, data of link information is inserted in LICH, data of a signaling control is inserted in SCCH, data of a fast-speed associated control is inserted in FACCH, and data of a guard time is inserted in G.

Figure 6:
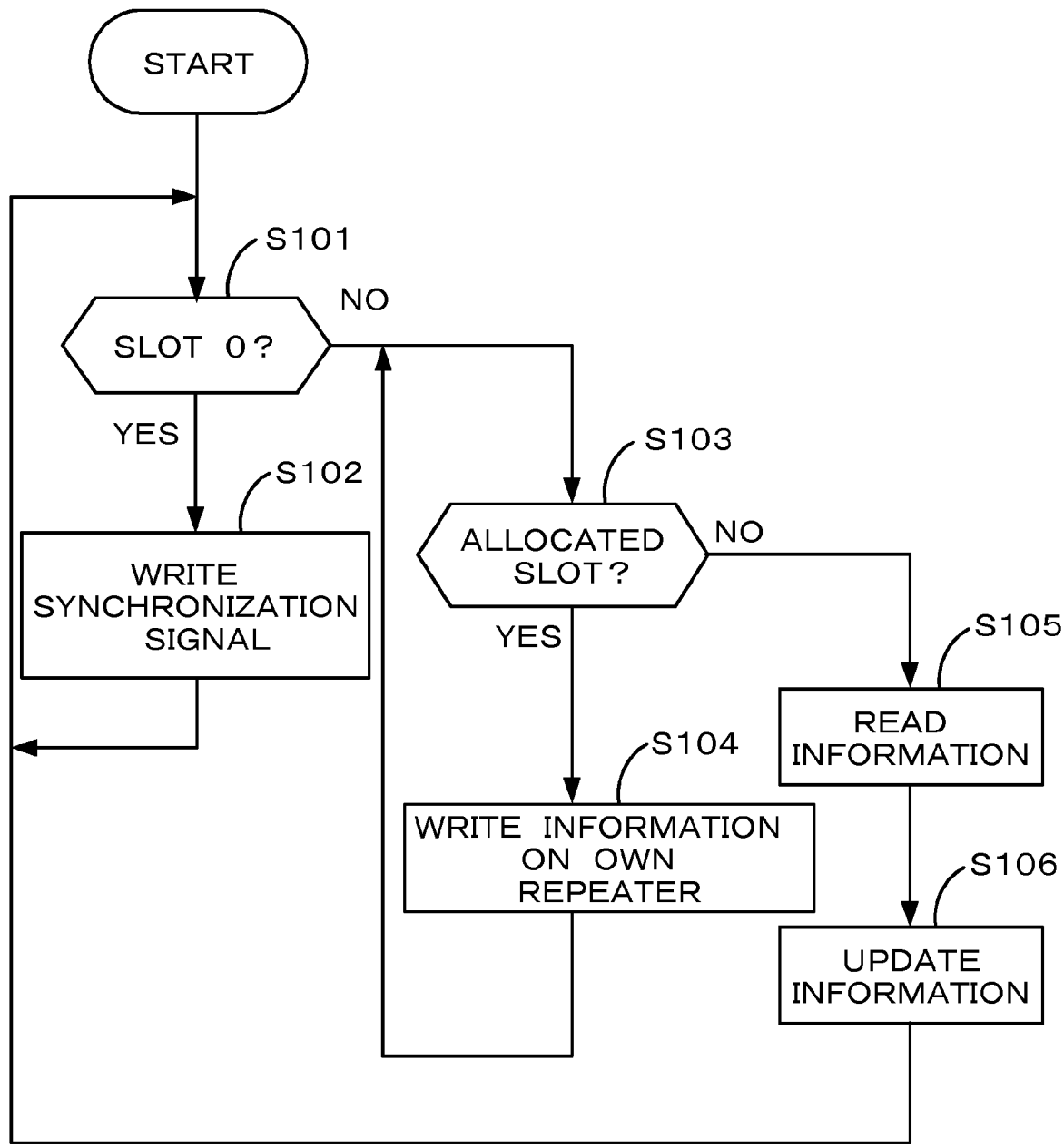
FIG. 6 is a flowchart executed by a CPU of a repeater $111_1$ in FIG. 1.

FIG. 6 is a flowchart showing an operation of the master repeater $111_1$ (the repeater $111_1$). As explained above, the master repeater $111_1$ transmits the synchronization signal output by the synchronous circuit 48 in the slot 0 in FIG. 4, and the other repeaters $111_2$ to $111_n$ which serve as the slave repeaters to the master repeater $111_1$ each acquires the synchronization signal, and the repeater system 130 including the master repeater $111_1$ operates in synchronization with the synchronization signal. Moreover, the synchronization signal is transmitted over the system bus 115 for each 80 ms equal to the period of a communication frame.

The wireless communication system of the embodiment allows one repeater among the repeaters $111_1$ to $111_n$ to be a master repeater in accordance with a predetermined rule at the time of an initial start-up. It is presumed that the repeater $111_1$ serves as the master repeater and transmits a synchronization signal. The other repeaters $111_2$ to $111_n$ automatically serve as slave repeaters and acquire the synchronization signal transmitted by the master repeater$_1$. Moreover, any one of the slots from the slot 1 to the slot 30 is allocated to each of the repeaters $111_1$ to $111_n$. Furthermore, the repeaters $111_1$ to $111_n$ each grasps which slots are respectively allocated to the other repeaters. The synchronous circuit 48 and the clock unit 45 determine the timing of transmitting information to an allocated slot. That is, the synchronization signal is transmitted for each 80 ms, and information on each repeater is transmitted by measuring a time from the transmission of the synchronization signal to the allocated slot. Based on such configuration, an explanation will now be given of the transmission of the synchronization signal, performed by the master repeater $111_1$ and the transmission of information on master repeater, and the acquisition of information on the other repeaters $111_2$ to $111_n$.

In a step S101, the CPU 41 determines whether or not 80 ms has elapsed from the previous transmission of a synchronization signal, i.e., whether or not a slot is the slot 0 (step S101), and when the slot is the slot 0, the CPU 41 writes a synchronization signal in the slot 0 (step S102). In the step S101, when 80 ms has not elapsed yet from the previous transmission of the synchronization signal, i.e., when the slot is not the slot 0, it is determined whether or not the slot is an allocated slot which is allocated to a own repeater (step S103). When the slot is the allocated slot, own information is written in the allocated slot (step S104). When the slot is not the allocated slot, i.e., when the slot is an allocated slot to another repeater, the CPU 41 reads in information on that slot (step S105). Next, information in the RAM 43 is updated based on the read information (step S106).

Figure 7:
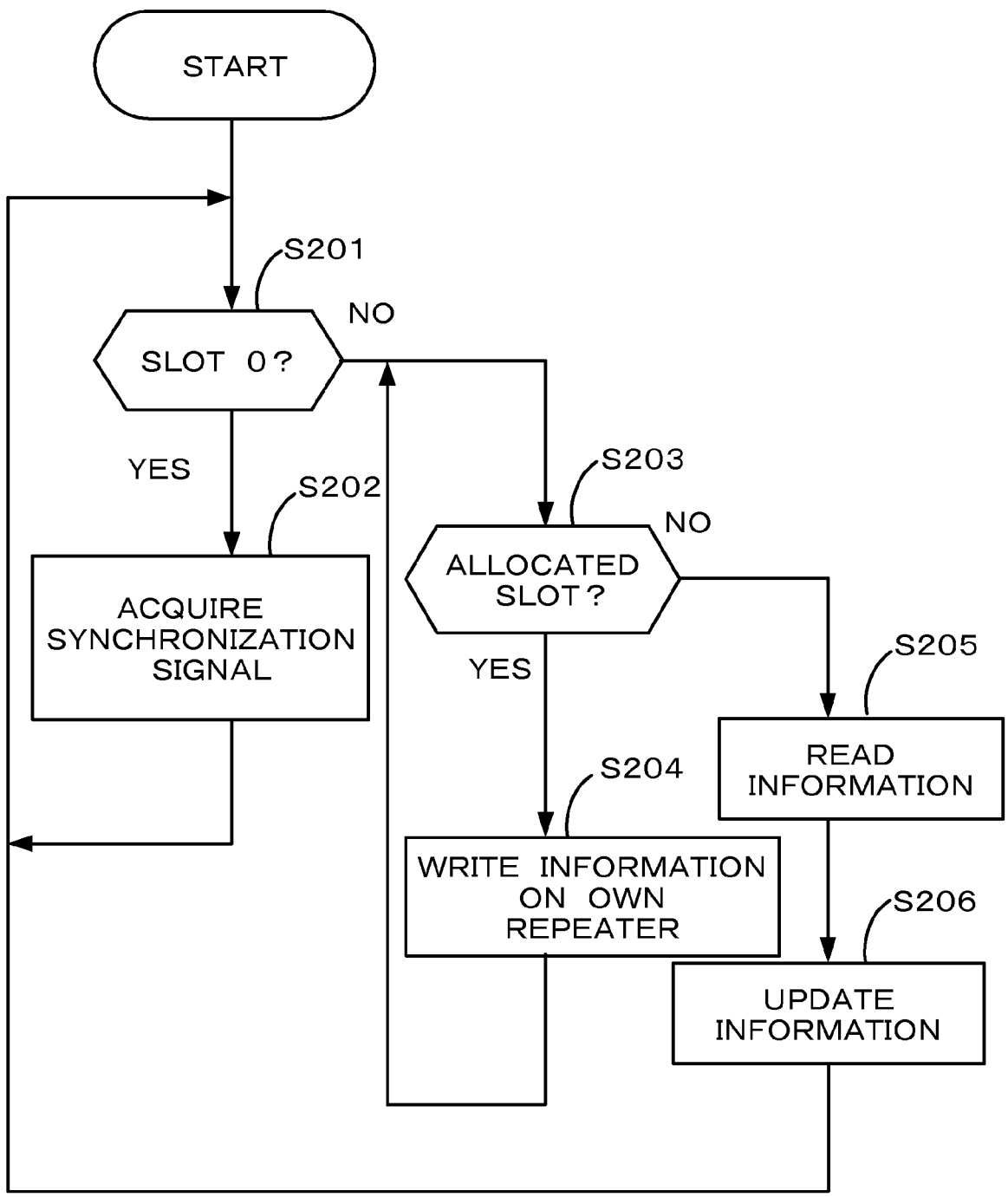
FIG. 7 is a flowchart executed by respective CPUs of repeaters $111_2$ to $111_n$ in FIG. 1.

FIG. 7 is a flowchart showing an operation of each of the slave repeaters (the repeaters $111_2$ to $111_n$). Like the master repeater $111_1$, the slave repeaters $111_2$ to $111_n$ each acquires a synchronization signal transmitted in the slot 0 and operates in synchronization with that synchronization signal. Moreover, the clock unit 45 clocks an elapsed time after the synchronization signal is output.

While the power is being turned on, the slave repeaters $111_2$ to $111_n$ each repeats a process shown in FIG. 7, and first, determines in a step S201 whether or not a current time slot is a slot in which a synchronization signal is transmitted, i.e., whether or not the current time slot is the slot 0 from the clocked time by the clock unit 45. When the current time slot is the slot 0, the synchronization signal which has been transmitted in the slot 0 is acquired (step S202). In the step S201, when the current time slot is not the slot 0 in which the synchronization signal is transmitted, a time is measured after the acquisition of a synchronization signal, and it is determined whether or not the timing is a timing of an allocated slot which is allocated to a own repeater (step S203). When the current time slot is the allocated slot, information on the own repeater is written in the allocated slot (step S204). When the slot is not the allocated slot, i.e., when the slot is the allocated slot to another repeater, the slave repeaters $111_2$ to $111_n$ each reads information on that slot (step S205). Next, information in the RAM 43 is updated based on the read information (step S206).

Figure 8:
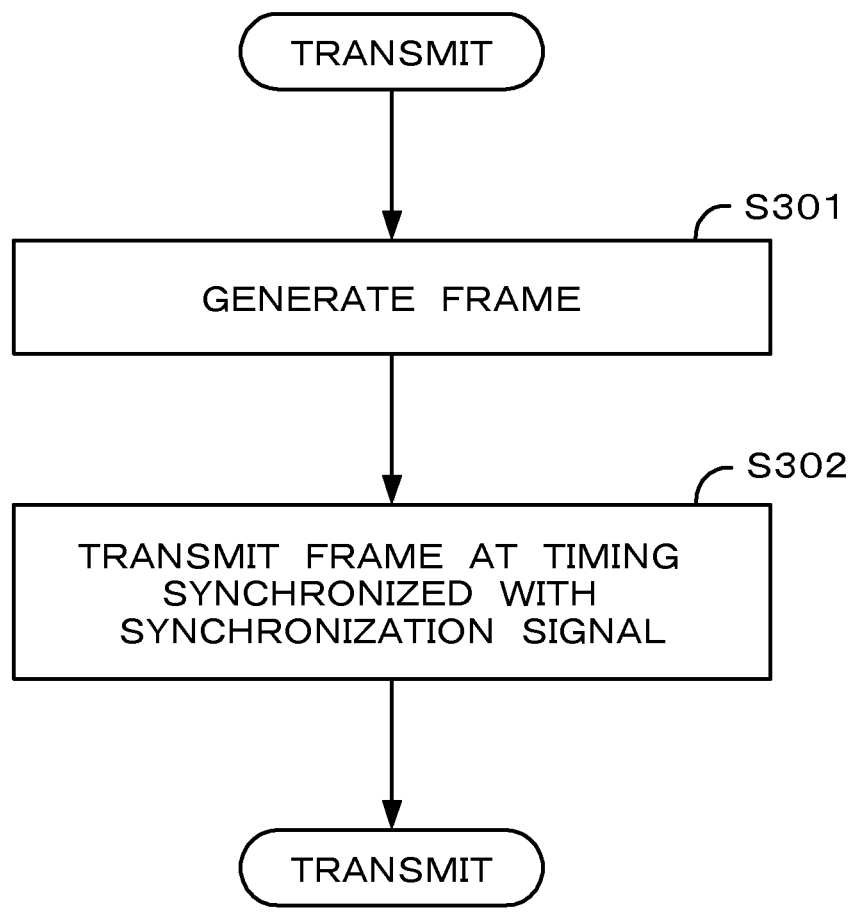
FIG. 8 is a flowchart executed at the time of transmitting a communication frame.

Conversely, as shown in a flowchart of FIG. 8, when the repeaters $111_1$ to $111_n$ each transmits a communication frame, first, generates a transmission frame (step S301), and transmits that communication frame in synchronization with a synchronization signal (step S302). That is, as shown in FIG. 9, the wireless communication system outputs a communication frame in synchronization with a synchronization signal.

Conversely, the synchronous circuit 28 of each of the wireless communication terminals TA to TH oscillates in synchronization with the communication frame. Consequently, the wireless communication terminals TA to TH are also operating in synchronization with the communication frame.

As explained above, in the foregoing embodiment, the master repeater $111_1$ transmits a synchronization signal to the system bus at the period of 80 ms equal to the length of a communication frame. The slave repeaters $111_2$ to $111_n$ each acquires the synchronization signal transmitted to the system bus. The repeaters $111_1$ to $111_n$ operate in synchronization with the synchronization signal. As the period of the synchronization signal with which the repeaters $111_1$ to $111_n$ synchronize is same as the length of the communication frame, each of the repeaters $111_1$ to $111_n$ can transmit a downlink signal synchronized with the synchronization signal.

According to the wireless communication system, a channel where wireless terminal devices communicate with each other is not a fixed channel, but the wireless terminal device request a permission for communication to any one repeater in the repeaters $111_1$ to $111_n$ that is an idle channel among relaying channels unique to the respective repeaters $111_1$ to $111_n$, and starts a communication when receiving a response to the effect that the communication is permitted from the repeater to which the permission for communication is requested. Accordingly, the wireless terminal device is forced to change a channel frequency. In particular, according to a digital wireless communication, a frame synchronization signal in a communication frame is detected, and data following such frame synchronization signal is demodulated. Accordingly, if the detection of the frame synchronization signal is delayed, data to be received loses a header. Hence, when a wireless communication system like the present embodiment is built with a digital wireless communication, a PLL with a fast lock-up time is requisite for the wireless terminal device, resulting in increase of a cost.

According to the present embodiment, however, the operation of each of the repeaters $111_1$ to $111_n$, the communication frame transmitted by each of the repeaters $111_1$ to $111_n$, and the operation of each of the wireless terminal devices TA to TH are synchronized one another. Moreover, the synchronous circuit 28 of each of the wireless terminal devices TA to TH has a relatively long time constant, and once establishes a synchronization, maintains a prior synchronized state for a while (e.g., the period of two communication frames) even if the change or the like of a channel is made. Accordingly, each of the wireless terminal devices TA to TH can change a channel while maintaining a synchronized state with the communication frame. Accordingly, it is possible for the wireless terminal device to receive the communication frame with a header not being lost and without using an expensive PLL with a fast lock-up time.

In the foregoing embodiment, the transmission step and the communication step correspond to the functions of the CPU 41 of each of the repeaters $111_1$ to $111_n$. Moreover, the transmission step and the communication step may be individually realized by electronic circuits, such as a transmitting circuit and a communication circuit instead of the functions of the CPU 41.

Note that the foregoing embodiment is provided to give explanations of the present invention, and the present invention is not limited to the foregoing embodiment, and other embodiments and modified embodiments which can be though out by those skilled in the art are also included in the present invention without departing from the scope and the spirit of the present invention.

Although the frame period is exemplified as 80 ms, the value of the frame period and the format thereof can be changed as needed. The circuit configuration or the like is also arbitrary, and various changes can be made such that a part of the circuit realized by a hardware is realized by a software, and the function realized by a software is realized by a hardware.

DESCRIPTION OF REFERENCE NUMERALS

TA to TH Wireless terminal device
$111_1$ to $111_n$ Repeater
100 Site
104 Server
115 Communication line
130 Repeater system

The invention claimed is:

1. A wireless communication system comprising:
a relay system comprising a plurality of relay devices which are connected to one another via a system bus, wherein a unique relaying channel is allocated to each of the plurality of relay devices;
a plurality of wireless terminal devices which communicate with each other via the relay system, and each of the plurality of wireless terminal devices being registered to one of the plurality of relay devices;
wherein each of the plurality of relay devices transmits control information to each of the wireless terminal devices with which it is registered;
wherein each wireless terminal device receives the control information transmitted from the relay device to which it is registered, selects a channel which is currently able to relay a communication among the unique relaying channels respectively allocated to the plurality of relay devices based on the received control information, and communicates with another wireless terminal device via the selected channel;
wherein each of the plurality of relay devices receives a synchronization signal via the system bus to configure the control information, and wirelessly transmit a downlink signal to the wireless terminal device to which the relay device is registered; and
wherein each of the plurality of wireless terminal devices maintains, when shifting a channel for communication to another channel, a synchronized state with the plurality of relay devices through the system bus and to the plurality of wireless terminal devices established prior to shifting for at least a predetermined period.

2. The wireless communication system according to claim 1, wherein a transmission period of the synchronization signal is set to be equal to a frame length of a downlink communication frame.

3. The wireless communication system according to claim 1, wherein the relay system comprises a master relay device which transmits a synchronization signal to the system bus, and a slave relay device which acquires the synchronization signal via the system bus.

4. The wireless communication system according to claim 3, wherein
the master relay device includes a synchronous circuit which generates a synchronization signal,
the slave relay device includes a synchronous circuit which oscillates in synchronization with a received synchronization signal, the master relay device and the slave relay device transmit respective downlink signals in synchronization with the synchronization signal, and
the wireless terminal device includes a synchronous circuit which synchronizes with a received downlink signal, and the synchronous circuit is able to maintain an established synchronized state for equal to or more than a synchronization period.

5. The wireless communication system according to claim 1, wherein each relay device transmits information held in the relay device at an allocated position to the relay device in the communication signal transmitted over the system bus, and each relay device further acquires information held in another relay device from a communication frame in the system bus and generates control information which is wirelessly transmitted by the own relay device based on the acquired information.

6. The wireless communication system according to claim 1, further comprising:
a master relay device which transmits a synchronization signal for establishing a synchronization with the plurality of relay devices through the system bus; and
a slave relay device which acquires the synchronization signal transmitted by the master relay device via the system bus and which operates in synchronization with the synchronization signal.

7. The wireless communication system according to claim 1, comprising:
an output unit which outputs stored information held in the relay device at an allocated position in a communication signal transmitted over the system bus;
an input unit which receives transmitted information from another relay device in the communication signal transmitted over the system bus; and
a processor which generates control information for controlling each wireless terminal device which the relay device wirelessly communicates with, wherein the processor synchronizes the downlink signal wirelessly transmitted by the relay device with the communication signal transmitted over the system bus.

8. A synchronization method of causing a relay system comprising a plurality of relay devices which are connected one another via a system bus, wherein a unique relaying channel is allocated to each of the plurality of relay devices to synchronize with a plurality of wireless terminal devices which communicate with each other via the relay system, the synchronization method comprising:
a transmission step in which one of the plurality of relay devices transmits control information to one of the wireless terminal devices which is registered to the one of the plurality of relay devices, with each of the plurality of relay devices being assigned a unique relay channel; and
a communication step in which the one of the wireless terminal devices selects a communication channel from among unique relaying channels assigned to each relay device which is currently able to relay a communication signal through a system bus, based on the control information, wherein in the transmission step, the one of the plurality of relay devices acquires information for configuring the control information via the system bus and synchronizes a downlink signal wirelessly transmitted by the one of the plurality of relay devices with a communication signal transmitted over the system bus, and in the communication step, the wireless terminal device maintains, when shifting communication channel to another communication channel, a synchronized state with the plurality of relay devices and the plurality of wireless terminal devices established prior to shifting.

* * * * *